(12) United States Patent
Chen et al.

(10) Patent No.: US 8,226,054 B2
(45) Date of Patent: Jul. 24, 2012

(54) DISPLAY FRAME AND SUPPORT UNIT THEREOF

(75) Inventors: Chun-Lung Chen, Zhonghe (TW); Chien-Cheng Yeh, Zhonghe (TW); Yen-Chou Chen, Zhonghe (TW)

(73) Assignee: Syncmold Enterprise Corp., Zhonghe (TW)

( * ) Notice: Subject to any disclaimer, the term of this patent is extended or adjusted under 35 U.S.C. 154(b) by 0 days.

(21) Appl. No.: 12/906,329

(22) Filed: Oct. 18, 2010

(65) Prior Publication Data

US 2012/0090212 A1    Apr. 19, 2012

(51) Int. Cl.
*F16M 11/00* (2006.01)
(52) U.S. Cl. ............... 248/127; 248/372.1; 248/917; 248/676; 16/337; 40/749; 361/679.21
(58) Field of Classification Search ............... 248/127, 248/454, 455, 457, 372.1, 917, 919, 922, 248/676; 16/337, 340, 361; 361/679.21; 40/749

See application file for complete search history.

(56) References Cited

U.S. PATENT DOCUMENTS

| 7,424,991 | B2 * | 9/2008 | Kim et al. | 248/125.9 |
| 7,644,897 | B2 * | 1/2010 | Shin | 248/176.1 |
| 7,673,844 | B2 * | 3/2010 | Zhang et al. | 248/372.1 |
| 7,698,784 | B2 * | 4/2010 | Hsu et al. | 16/337 |
| 7,770,856 | B2 * | 8/2010 | Depay | 248/284.1 |
| 7,828,255 | B2 * | 11/2010 | Yen et al. | 248/162.1 |
| 7,922,133 | B2 * | 4/2011 | Hsu | 248/127 |
| 7,967,273 | B2 * | 6/2011 | Zhou et al. | 248/372.1 |
| 8,011,632 | B2 * | 9/2011 | Wang et al. | 248/284.1 |

* cited by examiner

*Primary Examiner* — Anita M King
(74) *Attorney, Agent, or Firm* — C. G. Mersereau; Nikolai & Mersereau, P.A.

(57) ABSTRACT

A support unit of photo-frame-type display includes a connecting base unit, at least one pivoting unit fixed to the connecting base unit, a supporting housing and a rebounding module received in the supporting housing. The connecting base unit is mounted to the back of a display frame unit. The pivoting unit includes an axle shaft, a frictional washer-assembly, a spool member fixedly installed on the axle shaft, and a tension-connecting element. A tension-connecting element has one end fixed in the spool member and wound around the spool member, and one bottom end connected to the rebounding module. The frictional washer-assembly provides frictional force between the connecting base unit and the supporting housing. The rebounding module includes at least one elastic element. The present disclosure is capable of steadily sustaining the display frame unit in a steep inclining configuration suitable for touch-screen/handwriting operations.

18 Claims, 7 Drawing Sheets

DISPLAY FRAME AND SUPPORT UNIT THEREOF

BACKGROUND OF THE INVENTION

1. Field of the Invention

The present disclosure is related to a display frame and a support unit thereof, and more particularly to a support unit pivotally connected to the back of the display frame unit, wherein the bottom of the display frame unit is disposed on tabletop like a photo frame, and the support unit could be adjusted to securely support the display at different angles.

2. Description of Related Art

With the advancement in liquid crystal display technology, LCD has become widely accessible, and has been implemented in a wide range of applications, such as image display units for computers or televisions. Moreover, in recent years, LCD technology has even been upgraded to encompass touch-screen and handwriting recognition capabilities.

The LCD display with a conventional support unit is limited to a small inclining angle. For one thing, the conventional support unit often has difficulties reaching and maintaining a wide inclining angle suitable for touch-screen operations. Moreover, when the LCD is equipped with touch-screen/handwriting capabilities, a conventional support unit may not provide sufficient support to hold the LCD unit stationary; the swaying and shaking of the display from a user's touch not only may cause operational inaccuracy, but may also negatively affect the user's eyesight.

To prevent the LCD display from being swayed and shook during handwriting operations, there is one prior art providing a supporting frame add-on to a conventional supporting stand of a LCD. The conventional supporting stand is disposed on a tabletop supporting the entire weight of the display unit, while the two ends of the add-on supporting frame respectively join the upper and the lower ends of the conventional display stand to limit the swaying motion of the LCD.

Another prior art provides a supporting structure for a LCD to enable wide inclining angle adjustments. The supporting structure has two pairs of crossing legs coupled in a scissor-like manner that resemble the legs of a folding picnic table.

Unfortunately, the above-mentioned add-on structures lack integral structural unity when adapted to the display unit, thus negatively affect the appearance of the LCD as a whole. Moreover, they still offer limited and inconvenient angle adjustment for the LCD. One the other hand, the esthetic yet secure structure of a traditional photo frame has made it a widely popular decorative indoor ornament for generations.

Therefore, it is desirable to propose a photo-frame-type display and a support unit thereof that is capable of providing secured structural support and offering wide inclining angle adjustment to address the above-mentioned problems.

SUMMARY OF THE INVENTION

The present disclosure provides a support unit of a photo-frame-type display. The support unit may be conveniently adjusted to securely support the display frame unit in a wide inclining configuration suitable for touch-screen/handwriting operations.

The other object of the present disclosure is to provide a support unit of a photo-frame-type display, which is suitable for display frame unit of different sizes.

To achieve the above objective, one aspect of the instant disclosure is to provide a support unit of photo-frame-type display having a connecting base unit, at least one pivoting unit, a supporting housing and a rebounding module. The connecting base unit is fixedly disposed to the back of a display frame. The at least one pivoting unit is fixed to the connecting base unit. Each of the at least one pivoting unit includes an axle shaft which is passed through and fixed to the connecting base unit, a frictional washer-assembly which is installed on the axle shaft and adjacent to one side of the connecting base unit, a spool member which is fixedly installed on the axle shaft, and a tension-connecting element which has one end fixed in the spool member and wound around the periphery of the spool member.

To achieve the other object of the present disclosure, the present disclosure further comprises a linking plate, wherein the linking plate has a plurality of sets of assembly holes for adjustably connecting with the base wall of the connecting base unit. In another embodiment, the linking plate has a pair of screwing slots in parallel.

The present disclosure has the advantageous as followed.

First, it can securely keep the display frame unit steady in a steep inclining configuration suitable for touch-screen/handwriting operations. The display frame unit can be sustained in configurations from being substantially vertical to the working surface to an inclining angle of at least 60 degrees. The elastic element can provide an enough recovery force for the supporting housing.

Second, the present disclosure provides the linking plate which is adaptable to the display frame unit of different sizes. The rebounding module is received in the supporting housing, and the back of the display frame unit is expressed concisely and is assembled conveniently. The present disclosure can increase the number of the tension-connecting element and elastic element, thus it can be applied on a heavier display frame unit.

For further understanding of the present disclosure, reference is made to the following detailed description illustrating the embodiments and examples of the present disclosure. The description is for illustrative purpose only and is not intended to limit the scope of the claim.

DETAILED DESCRIPTION OF THE PREFERRED EMBODIMENTS

To better understand the objective, structure, characteristics, and effects of the present disclosure, a description relating thereto will be made with reference to preferred embodiments thereof and the accompanying drawings.

Figure 1:
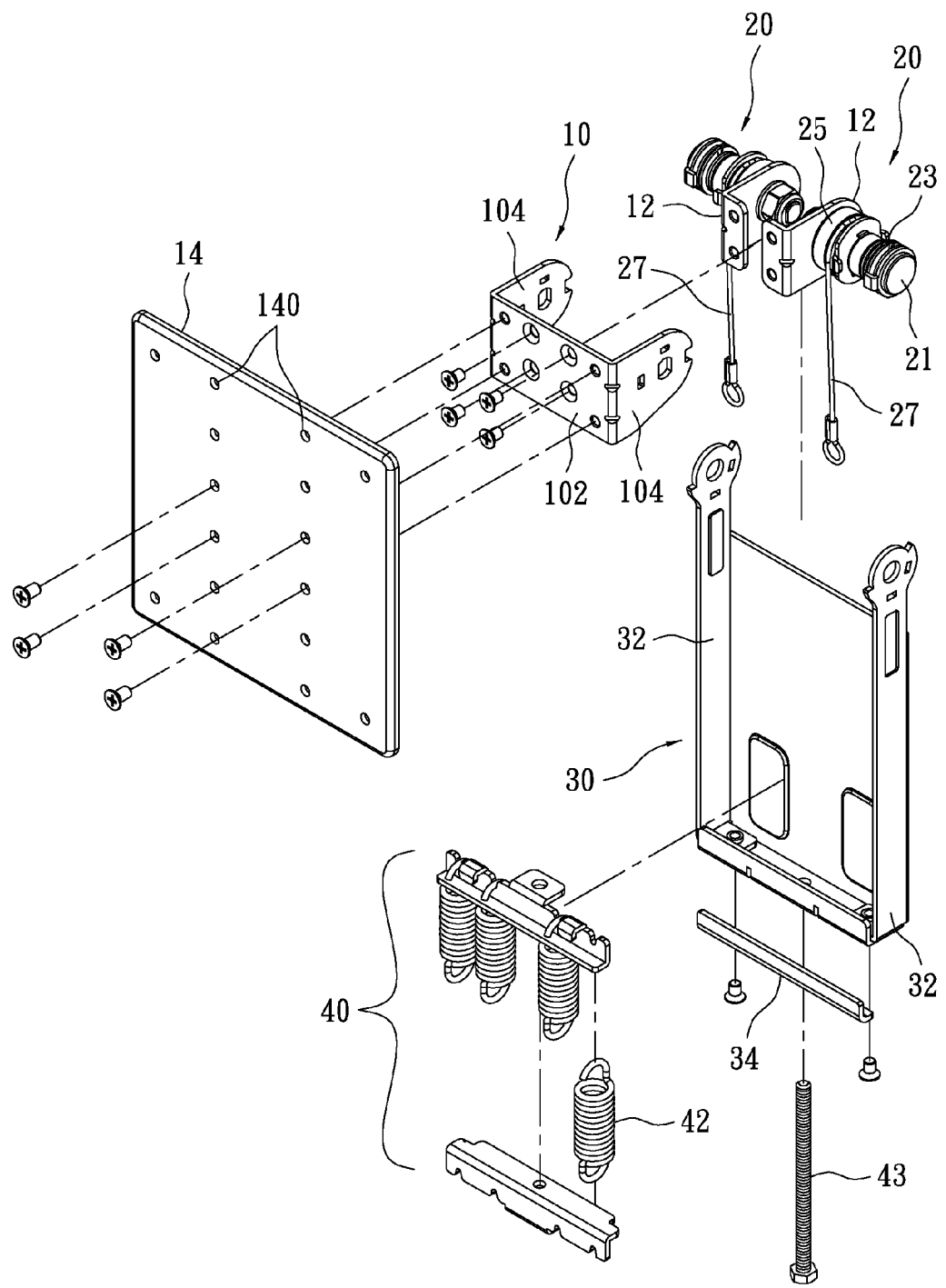
FIG. 1 is a perspective view of a support unit of photo-frame-type display according to the present disclosure.
Figure 2:
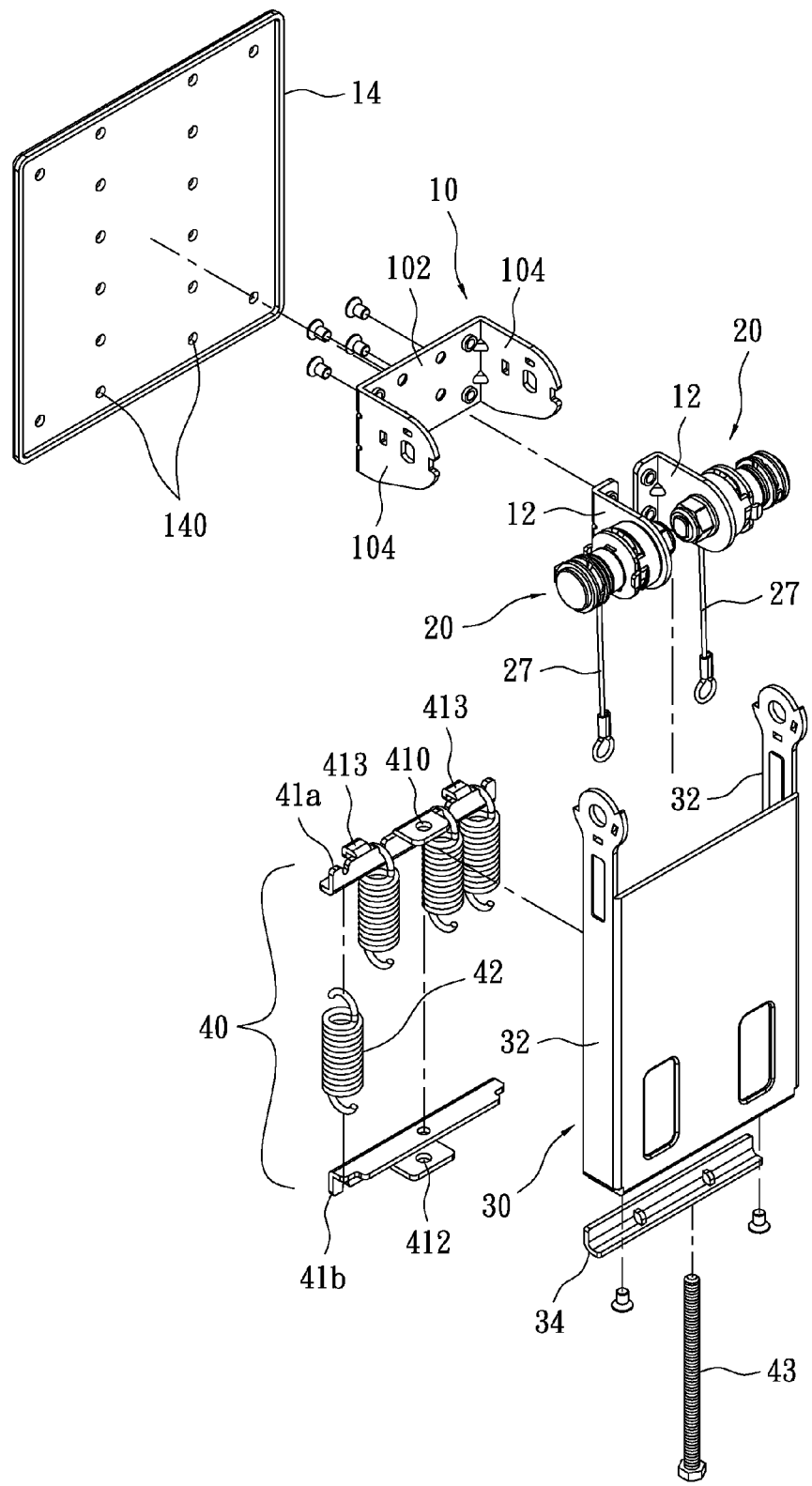
FIG. 2 is another perspective view of a support unit of photo-frame-type display according to the present disclosure.
Figure 5:
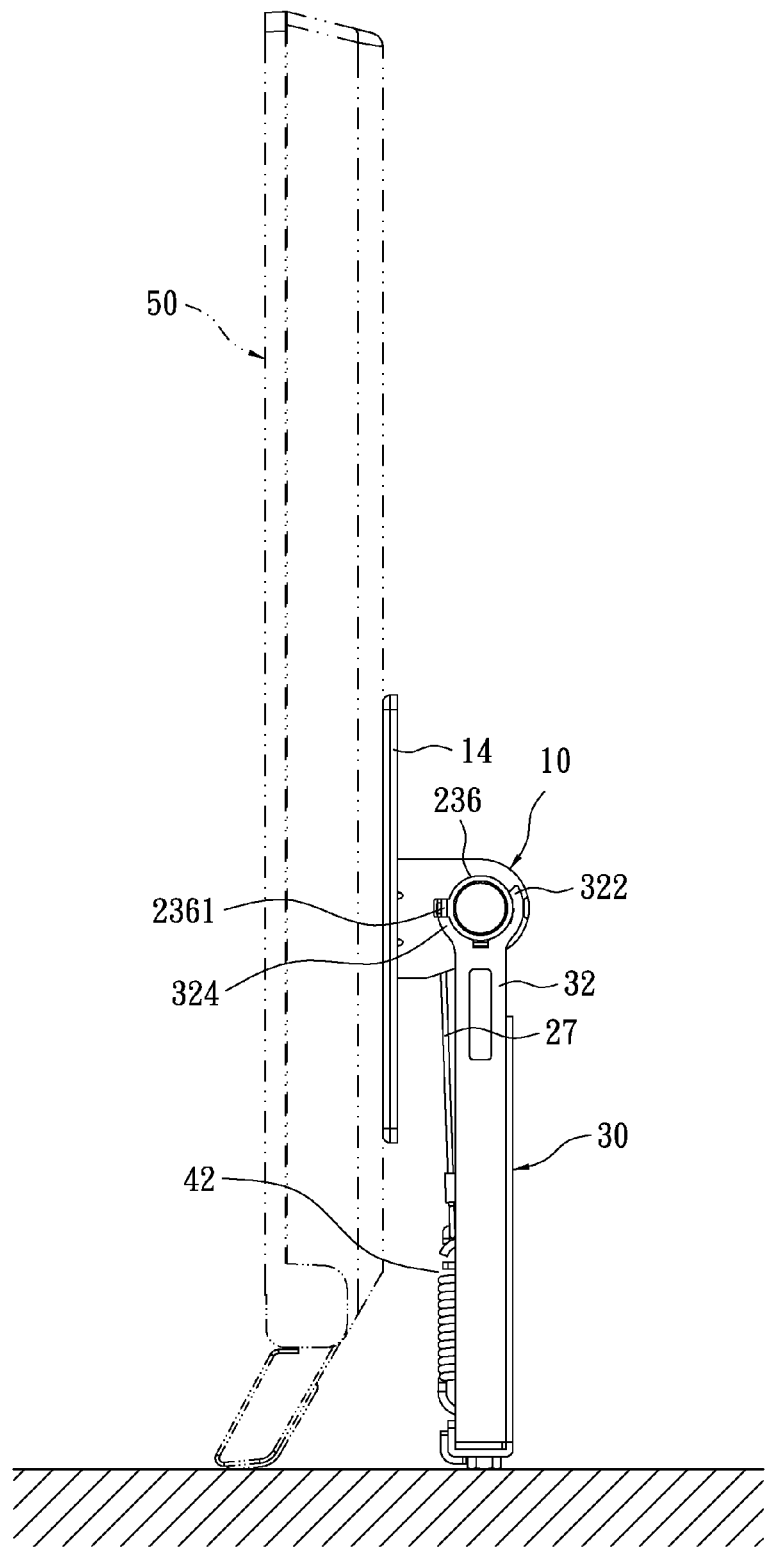
FIG. 5 is a side view of the support unit and a display frame unit in a closed position according to the present disclosure.

FIGS. 1 and 2 are perspective views of a support unit of photo-frame-type display according to the present disclosure. The present disclosure provides a support unit of photo-frame-type display mounted on the back of a display frame unit 50 (as shown in FIG. 5). The bottom of the support unit is disposed on a working surface, for example a tabletop, and the bottom of display frame unit 50 is also disposed on the working surface, so that it is shown as a photo-frame-type display, i.e. one display like a photo frame. The support unit of the photo-frame-type display includes a connecting base unit 10, at least one pivoting unit 20, a supporting housing 30, and a rebounding module 40.

The connecting base unit 10 is disposed at the back of the display frame unit 50 (shown in FIG. 5). In this embodiment, the connecting base unit 10 is U-shaped having a base wall 102 and a pair of side walls 104 extended from two sides of the base wall 102. The present disclosure further includes a linking plate 14. The linking plate 14 is formed with many groups of assembly holes 140 for connecting with the base wall 102 of the connecting base unit 10. Through the assembly holes 140, the position of the connecting base unit 10 related to the linking plate 14 can be adjusted. Through the linking plate 14, the present disclosure can be adapted to the display frame unit of different height. When the display frame unit is higher, the base wall 102 can be fixed on a lower group of the assembly hole 140 of the linking plate 14.

Figure 1A:
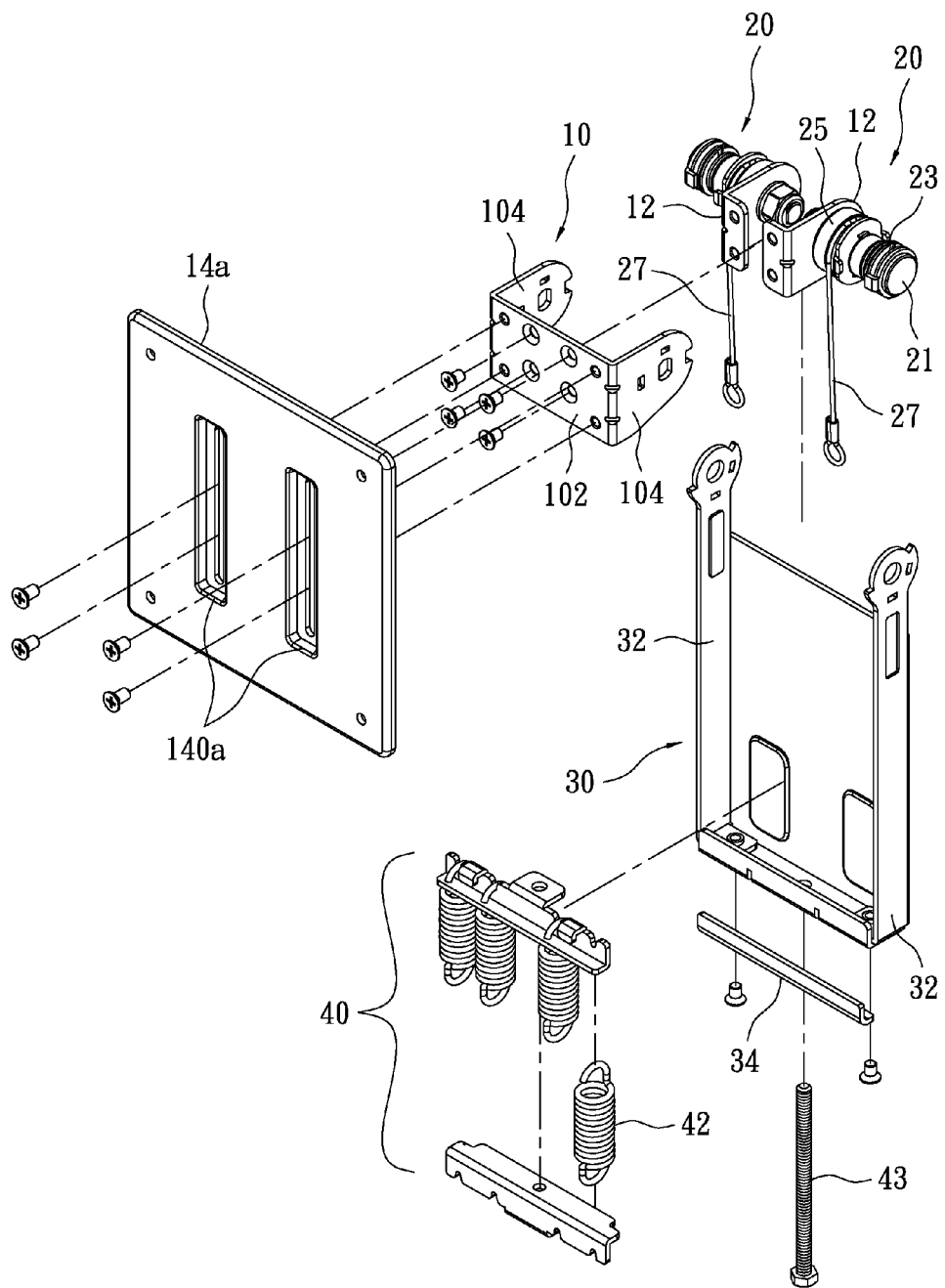
FIG. 1A is a perspective view of a support unit of photo-frame-type display of another embodiment according to the present disclosure.

Reference is made to FIG. 1A, which is an exploded perspective view of a support unit of photo-frame-type display of the second embodiment according to the present disclosure. According to this embodiment, another linking plate 14a is illustrated. The linking plate 14a has a pair of screwing slots 140a in parallel manner. A plurality of screws pass through the screwing slots 140a to fix the linking plate 14a to the base wall 102 of the connecting base unit 10. This embodiment therefore can be adapted to the display frame unit of different size. When the display frame unit is higher, the base wall 102 can be fixed at a lower portion of the linking plate 14a. The screws can tightly fasten the linking plate 14a to the base wall 102.

The pivoting unit 20 is mounted to the connecting base unit 10. The pivoting unit 20 includes an axle shaft 21, a frictional washer-assembly 23, a spool member 25, and a tension-connecting element 27. The axle shaft 21 is formed with a pair of parallel planes. A nut 210 and a resilient spacer 212 are disposed at one end of the axle shaft 21. The axle shaft 21 passes through and is fixed to the pair of side walls 104 of the connecting base unit 10. The frictional washer-assembly 23 is disposed on the axle shaft 21 and is adjacent to one side of the connecting base unit 10, thus frictional force is provided between the connecting base unit 10 and the supporting housing 30. Further information of the frictional washer-assembly 23 will be provided later. The spool member 25 is fixed on the axle shaft 21. The tension-connecting element 27 has one top end fixed in the spool member 25, and is partially wound around the periphery of the spool member 25. The tension-connecting element 27 could be a steel wire rope.

This embodiment has a pair of the pivoting unit 20 respectively attached to the pair of side walls 104 of the connecting base unit 10. The spool member 25 is located at the inner side of the side walls 104, and the frictional washer-assembly 23 is located at the outer side of the side walls 104. To strength the structure of the pivoting unit 20, this embodiment further includes a auxiliary board 12 which is fixed to the base wall 104 of the connecting base unit 10. The auxiliary board 12 contacts one side of the spool member 25. The axle shaft 21 passes through the auxiliary board 12, and the resilient spacer 212 contacts the auxiliary board 12. In this embodiment, the axle shaft 21 is supported by both of the side walls 104 and the auxiliary board 12, so that the supporting structure is enhanced. This is only one embodiment of the present disclosure. The pivoting unit 20 also can be disposed between the pair of side walls 104 of the connecting base unit 10. And, the axle shaft 21 can be passed through the pair of side walls 104.

Each of the spool members 25 has a central axle-hole 250, a guiding portion 251 formed on a periphery thereof, and a fixing hole 252 formed therein. The central axle-hole 250 has a contour matched with the shape of the axle shaft 21, so that the spool member 25 is fixed on the axle shaft 21. The fixing hole 252 holds one end of the tension-connecting element 27 in the spool member 25. The tension-connecting element 27 is partially wound in the guiding portion 251. In this embodiment, the spool member 25 further includes a retaining lid 26 disposed at outer surface thereof. The retaining lid 26 covers the tension-connecting element 27 behind the spool member 25.

The supporting housing 30 includes a pair of pivoting plates 32 at two sides thereof. The pair of pivoting plates 32 is pivotally connected to the axle shaft 21. Each of the pivoting plates 32 is clipped by the frictional washer-assembly 23. The pivoting plates 32 are equipped with a pair of limiting portion 322, 324 respectively. In this embodiment, a separating spacer 235, and a positioning washer 236 are disposed at outer side of the supporting housing 30. The separating spacer 235 is fixed on the pivoting plates 32, and is pivotally connected with the axle shaft 21. The positioning washer 236 is fixedly installed on the axle shaft 21, which has a positioning tab 2361 movably sliding between the pair of limiting portions 322, 324. The pair of the limiting portions 322, 324 has an included angle about 120 degrees, which is the turning range of the supporting housing 30. In other words, the display frame unit 50 can be sustained in configurations from being substantially vertical to the working surface to an inclining angle of at least 60 degrees. This embodiment further includes an anti-sliding pads 34 fixed on the bottom of the supporting housing 30.

Figure 4:
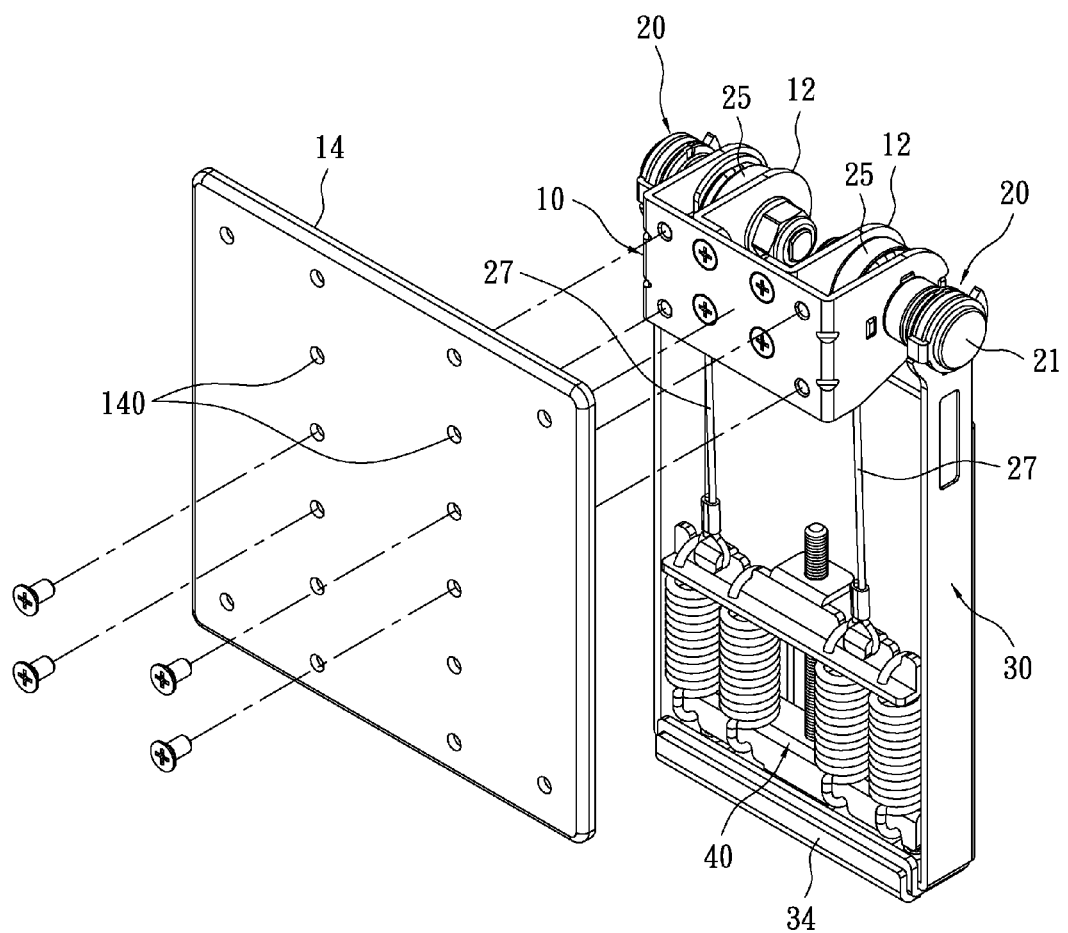
FIG. 4 is an assembled perspective view of the support unit of photo-frame-type display according to the present disclosure.

The rebounding module 40 is received in the supporting housing 30. The rebounding module 40 includes at least one elastic element 42 which is received in the supporting housing 30. The bottom end of the tension-connecting element 27 is connected to the rebounding module 40. The elastic element 42 in this embodiment is a spring; however it can be replaced by other element with elasticity. In this embodiment, the rebounding module 40 includes four elastic elements 42, a blot 43 which is vertically passed through the bottom of the supporting housing 30, and a pair of holding rack 41a, 41b which is installed on the bolt 43. The spring 42 has two ends respectively fixed to the pair of holding racks 41a, 41b. As shown in FIGS. 2 and 4, the upper holding rack 41a has two hooks 413 to connect with the bottom end of the tension-connecting element 27. The holding racks 41a, 41b are respectively formed with a screwed hole 410 and 412 for the bolt 43 passing there through.

Figure 3:
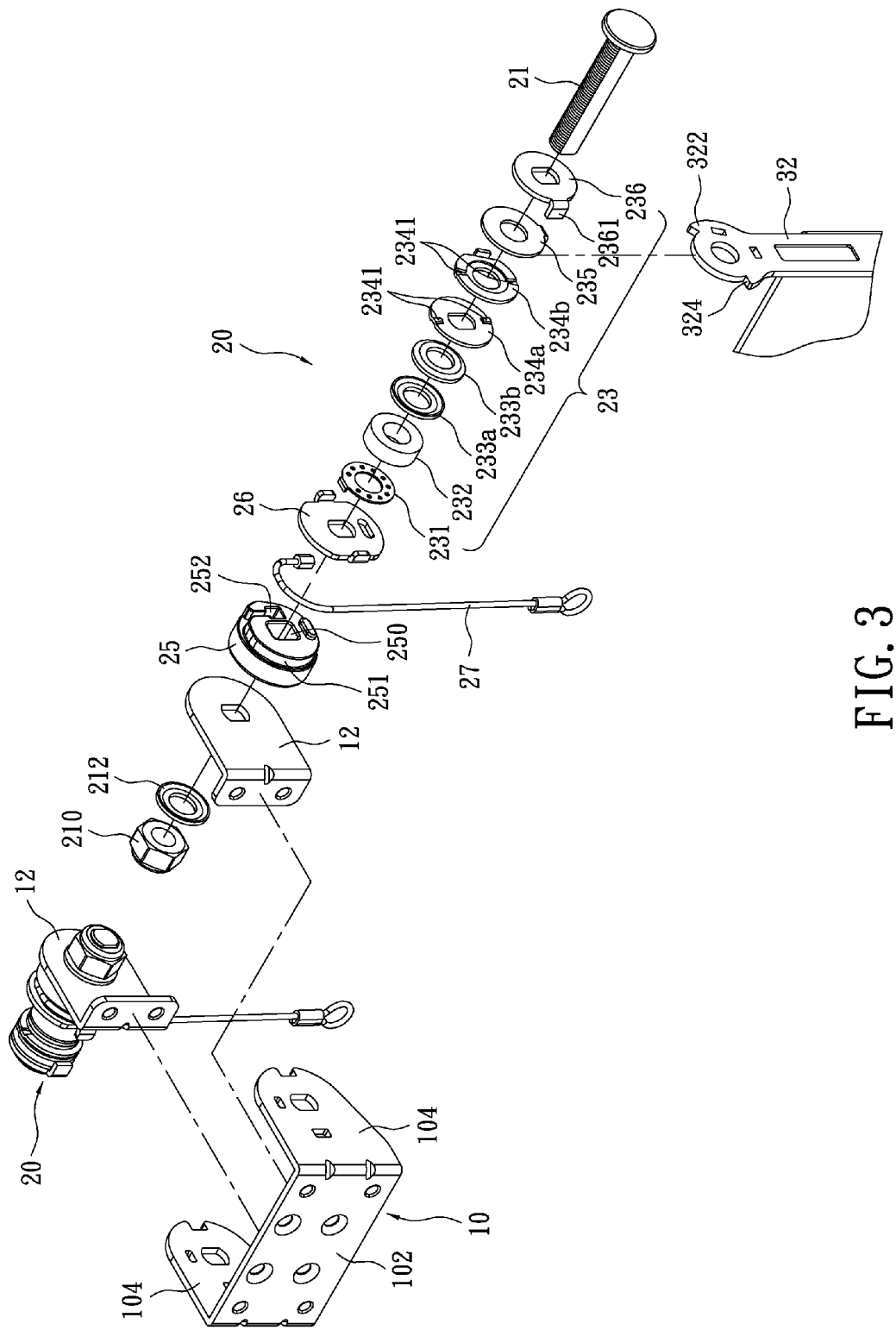
FIG. 3 is an exploded view of a pivoting unit of the support unit according to the present disclosure.

Reference is made to FIG. 3, which is an exploded view of the pivoting unit of the support unit according to the present disclosure. The pivoting unit 20 is described in detail as followed. The frictional washer-assembly 23 is installed on the axle shaft 21, and is located between the pivoting plates 32 of the supporting housing 30 and the auxiliary board 12 to provide frictional force. The frictional washer-assembly 23 includes a friction washer 231 which is disposed at outer side of the side walls 104 of the connecting base unit 10, a durable washer 232 which is disposed at the outer side of the friction washer 231, a pair of resilient spacers 233a, 233b which is disposed at the outer side of the durable washer 232, and a pair of retainer washer 234a, 234b which is disposed at the outer side of the pair of resilient spacer 233a, 233b.

The frictional washer-assembly 23 of the present disclosure has following functions. First, by tightly screwing the nut 210 of the axle shaft 21, the resilient spacers 233a, 233b are pressed, so that the frictional force provided from the frictional washer-assembly 23 is adjustable. Further, the pair of retainer washers 234a, 234b retains the supporting housing 30 at a closed position. The pair of retainer washers 234a, 234b are formed respectively a pair of protruding dimples 2341. The inner retainer washer 234a is fixed on the axle shaft 21. The outer retainer washer 234b is fixed to the inner side of the pivoting plates 32 of the supporting housing 30, and is rotatably installed on the axle shaft 21. When user closes the supporting housing 30 to the display frame unit, the protruding dimples 2341 of the pair of retainer washers 234a, 234b can provide user an operating feeling to inform the user that the supporting housing 3 has reached the predetermined position. The user needs to apply a proper force and then the supporting housing 30 is allowed to be turned outwardly.

Reference is made to FIG. 4, which is an assembled perspective view of the support unit of photo-frame-type display according to the present disclosure. The present disclosure provides the linking plate 14 assembled to the display frame unit. The connecting base unit 10 is mounted on the linking plate 14. The pivoting unit 20 is pivotally connected between the connecting base unit 10 and the supporting housing 30, so that the supporting housing 30 can be turned outwardly. The rebounding module 40 is received in the supporting housing 30 to provide recovered force for the supporting housing 30 recovering to the original position.

Figure 6:
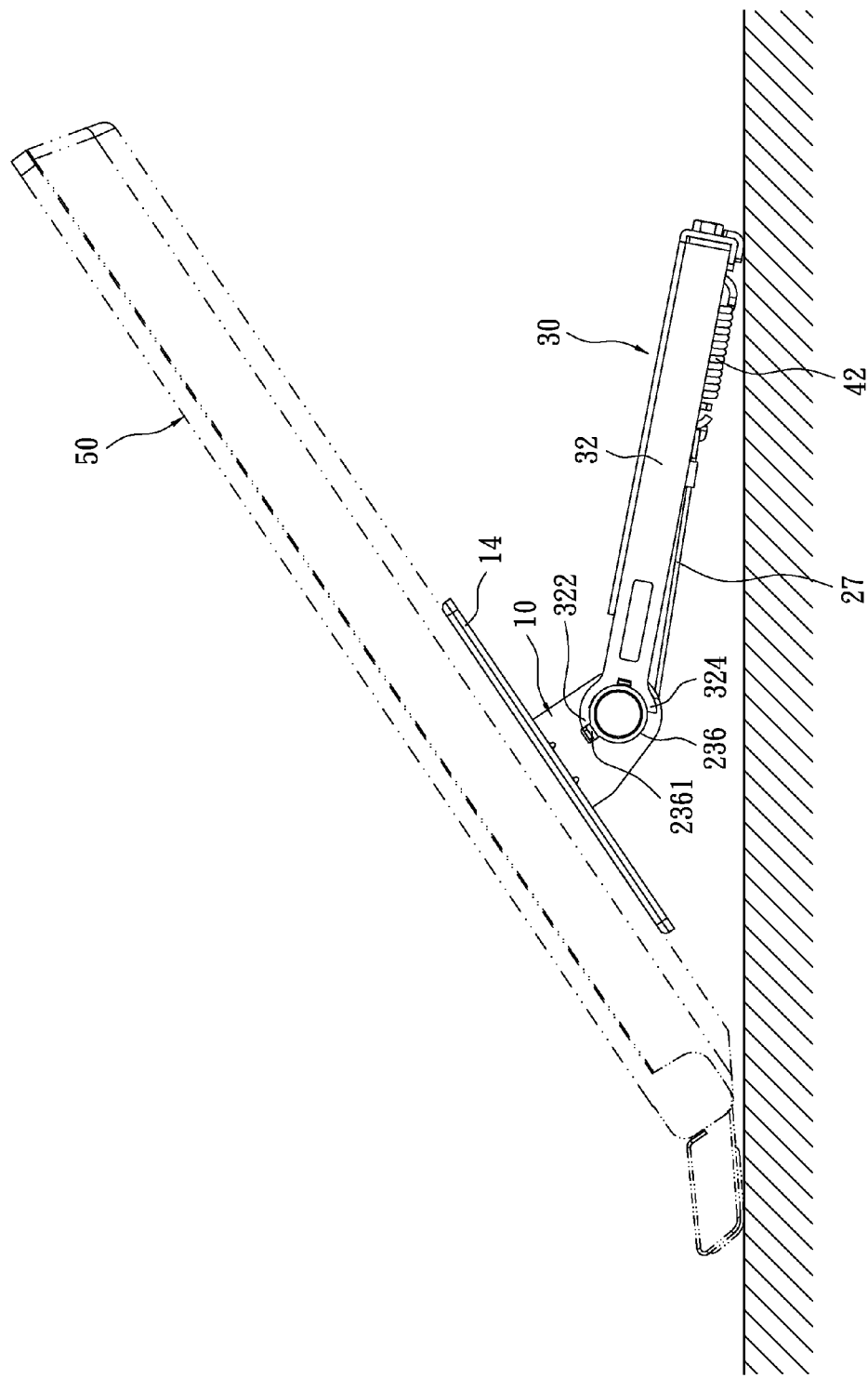
FIG. 6 is a side view of the support unit and the display frame unit in a wide inclining angle according to the present disclosure.

Reference is made to FIGS. 5 and 6, which show side views of the support unit and the display frame unit. These figures only show a sketch structure and it can be beatified with covers. The present disclosure can provides covers or lids to enhance the appearance and protection. As shown in FIG. 5, the display frame unit 50 of the instant disclosure can be disposed on a working surface like a traditional photo frame. As shown in FIG. 6, for one thing, the display frame unit 50 can be tilted backward at a steep inclining angle. Particularly, the inclining module is configurable to sustain the display frame unit in configurations from being substantially vertical to the working surface to an inclining angle of at least 60 degrees. Moreover, the elastic element 42 can provide the supporting housing 30 a sufficient holding force, thereby securely keeping the display frame unit 50 steady in a steep inclining configuration suitable for touch-screen/handwriting operations. The present disclosure can increase the number of the tension-connecting element and elastic element, thus it can be applied on a heavier display frame unit. Thus, the present disclosure enables the display frame unit 50 is stable and is not swayed and shook during touch-screen/handwriting operations anymore.

When the display frame unit 50 is turned rearward, the positioning tab 2361 of the positioning washer 236 moves between the pair of limiting portions 322, 324. The tension-connecting element 27 is wound, and the elastic element 42 is pulled and lengthened. When the display frame unit 50 is turned forward, the elastic force of the elastic element 42 pulls the tension-connecting element 27 to provide a recovery force for the supporting housing 30.

The description above only illustrates specific embodiments and examples of the present disclosure. The present disclosure should therefore cover various modifications and variations made to the herein-described structure and operations of the present disclosure, provided they fall within the scope of the present invention as defined in the following appended claims.

What is claimed is:

1. A support unit of photo-frame-type display, comprising:
a connecting base unit fixedly disposed to the back of a display frame;
at least one pivoting unit fixed to the connecting base unit, including:
an axle shaft running through and fixed to the connecting base unit;
a frictional washer-assembly installed on the axle shaft and adjacent to one side of the connecting base unit, the frictional washer-assembly including:
a friction washer adjacent to the connecting base unit,
a durable washer disposed at the outer side of the friction washer,
a pair of resilient spacers disposed at the outer side of the durable washer, and
a pair of retainer washers disposed at outer sides of the pair of resilient spacers, wherein a protruding dimple is formed on each retainer washer,
a spool member fixedly installed on the axle shaft; and
a tension-connecting element having one end fixed in the spool member and wound around the periphery of the spool member;
a supporting housing including a pair of pivoting plates pivotally connected to the axle shaft, wherein one of the pivoting plates is adjacent to the frictional washer-assembly; and
a rebounding module received in the supporting housing, including at least one elastic element received in the supporting housing, the tension-connecting element having one bottom end connected to the rebounding module.

2. The support unit of photo-frame-type display of claim 1, wherein the connecting base unit is U-shaped and has a base wall and a pair of side walls extending from two sides of the base wall, the axle shaft is fixedly running through the pair of side walls.

3. The support unit of photo-frame-type display of claim 2, further comprising a linking plate has a plurality of sets of assembly holes for adjustably connecting with the base wall of the connecting base unit.

4. The support unit of photo-frame-type display of claim 2, further comprising a linking plate having a pair of screwing slots in parallel for connecting with the base wall of the connecting base unit.

5. The support unit of photo-frame-type display of claim 2, wherein each side wall of the connecting base unit has a pivoting unit, wherein the spool member is located at the inner side of the side walls, the frictional washer-assembly is located at the outer side of the side walls.

6. The support unit of photo-frame-type display of claim 5, further comprising at least one auxiliary board fixed to the base wall of the connecting base unit and contacted with one side of the spool member, wherein the axle shaft runs through the auxiliary board.

7. The support unit of photo-frame-type display of claim 1, wherein the rebounding module further comprises a bolt running through the bottom of the supporting housing, a pair of holding rack installed on the bolt, wherein each end of the elastic element fixed to a holding rack.

8. The support unit of photo-frame-type display of claim 1, further comprising an anti-sliding pad fixed to the bottom of the supporting housing.

9. A support unit of photo-frame-type display, comprising:
a connecting base unit fixedly disposed to the back of a display frame;
at least one pivoting unit fixed to the connecting base unit, including:
an axle shaft running through and fixed to the connecting base unit;
a frictional washer-assembly installed on the axle shaft and adjacent to one side of the connecting base unit;
a spool member fixedly installed on the axle shaft; and
a tension-connecting element having one end fixed in the spool member and wound around the periphery of the spool member;
a supporting housing including a pair of pivoting plates pivotally connected to the axle shaft, wherein one of the pivoting plates is adjacent to the frictional washer-assembly; and
a rebounding module received in the supporting housing, including at least one elastic element received in the supporting housing, the tension-connecting element having one bottom end connected to the rebounding module, the rebounding module comprising:
a bolt running through the bottom of the supporting housing, and
a pair of holding rack installed on the bolt, wherein each end of the elastic element fixed to a holding rack.

10. A support unit of photo-frame-type display, wherein a top end of the support unit is pivotally connected with a back of a display frame, wherein the bottom of the support unit and the bottom of the display frame are disposed on a working surface, comprising:
a connecting base unit having two ends, wherein one end of the connecting base unit is fixedly disposed to the back of the display frame;
at least one pivoting unit arranged along a single axis and fixed to the connecting base unit, each pivoting unit including:
an axle shaft passed through and fixed to the other end of the connecting base unit;
a frictional washer-assembly installed on the axle shaft and adjacent to one side of the connecting base unit;
a spool member fixedly installed on the axle shaft, wherein the frictional washer-assembly and the spool member are coaxially installed on the axle shaft; and
a tension-connecting element having one end fixed in the spool member, and wound around the periphery of the spool member;
a supporting housing including a pair of pivoting plates formed on a top end thereof, wherein the pivoting plates are pivotally connected to the axle shaft, wherein one of the pivoting plates is adjacent to the frictional washer-assembly; and
a rebounding module received in the supporting housing, including at least one elastic element received in the supporting housing, the tension-connecting element having one bottom end connected to the rebounding module;
wherein the display frame and the support unit concurrently and cooperatively support and retain the display frame on the working surface at a desired display angle.

11. The support unit of photo-frame-type display of claim 10, wherein the connecting base unit is U-shaped and has a base wall and a pair of side walls extends from two sides of the base wall, the axle shaft is fixedly running through the pair of side walls.

12. The support unit of photo-frame-type display of claim 11, further comprising a linking plate has a plurality of sets of assembly holes for adjustably connecting with the base wall of the connecting base unit.

13. The support unit of photo-frame-type display of claim 11, further comprising a linking plate having a pair of screwing slots in parallel for connecting with the base wall of the connecting base unit.

14. The support unit of photo-frame-type display of claim 11, wherein each side wall of the connecting base unit has a pivoting unit, wherein the spool member is located at the inner side of the side walls, the frictional washer-assembly is located at the outer side of the side walls.

15. The support unit of photo-frame-type display of claim 14, further comprising at least one auxiliary board fixed to the base wall of the connecting base unit and contacted with one side of the spool member, wherein the axle shaft runs through the auxiliary board.

16. The support unit of photo-frame-type display of claim 10, wherein the frictional washer-assembly comprises:
a friction washer adjacent to the connecting base unit;
a durable washer disposed at the outer side of the friction washer;
a pair of resilient spacers disposed at the outer side of the durable washer; and
a pair of retainer washers disposed at outer sides of the pair of resilient spacers, wherein a protruding dimple is formed on each retainer washer.

17. The support unit of photo-frame-type display of claim 10, wherein the rebounding module further comprises a bolt running through the bottom of the supporting housing, a pair of holding rack installed on the bolt, wherein each end of the elastic element fixed to a holding rack.

18. The support unit of photo-frame-type display of claim 10, further comprising an anti-sliding pad fixed to the bottom of the supporting housing.

* * * * *